(12) United States Patent
Alfaro (10) Patent No.: US 11,473,991 B2
(45) Date of Patent: Oct. 18, 2022

(54) LOW-PRESSURE SENSOR WITH STIFFENING RIBS

(71) Applicant: Silicon Microstructures, Inc., Milpitas, CA (US)

(72) Inventor: Fernando Alfaro, Redwood City, CA (US)

(73) Assignee: MEASUREMENT SPECIALTIES, INC., Hampton, VA (US)

(*) Notice: Subject to any disclaimer, the term of this patent is extended or adjusted under 35 U.S.C. 154(b) by 138 days.

(21) Appl. No.: 16/729,442

(22) Filed: Dec. 29, 2019

(65) Prior Publication Data
US 2021/0199527 A1    Jul. 1, 2021

(51) Int. Cl.
*G01L 9/00*    (2006.01)
(52) U.S. Cl.
CPC .......... *G01L 9/0055* (2013.01); *G01L 9/0047* (2013.01)
(58) Field of Classification Search
CPC ... G01L 9/0042; G01L 9/0044; G01L 9/0045; G01L 9/0047; G01L 9/0048
See application file for complete search history.

(56) References Cited

U.S. PATENT DOCUMENTS

| | | |
|---|---|---|
| 4,467,656 A | 1/1984 | Mallon |
| 5,002,901 A | 3/1991 | Kurtz et al. |
| 5,165,289 A | 11/1992 | Tilmans |
| 5,177,579 A | 1/1993 | Jerman |
| 5,702,619 A | 12/1997 | Kurtz et al. |
| 5,891,751 A | 4/1999 | Kurtz et al. |
| 6,006,607 A | 12/1999 | Bryzek et al. |
| 6,093,579 A | 7/2000 | Sathe et al. |
| 6,168,906 B1 * | 1/2001 | Bernstein ............... G03F 7/00 430/324 |

(Continued)

FOREIGN PATENT DOCUMENTS

| | | |
|---|---|---|
| CN | 109708786 A | 5/2019 |
| EP | 2517026 A1 | 10/2012 |

(Continued)

OTHER PUBLICATIONS

French Preliminary Search Report dated Apr. 29, 2022, No. FR 2014192, 8 pages.

(Continued)

*Primary Examiner* — Tran M. Tran (57) ABSTRACT

Semiconductor MEMS pressure sensors that can produce a linear and large output signal when subject to a small pressure, without an increase to the front to back span error. One example can experience large deflections without causing catastrophic damage to the membrane. The pressure sensor can include a silicon layer having opposing surfaces, an etched pattern in of the surfaces of the silicon layer, and an etched cavity on the opposite surface of the silicon layer to form a membrane. The etched patterned can include a series of concentric stiffening ribs, an inverted boss, large depression areas next to the membrane edge and/or the boss, and piezoresistive strain concentrators. The ribs and depressions can be formed onto the silicon membrane by anisotropic or isotropic etch techniques. Piezoresistive devices can be diffused into the membrane in the regions near the strain concentrators to form a Wheatstone bridge or other measurement structure.

9 Claims, 8 Drawing Sheets

(56) References Cited

U.S. PATENT DOCUMENTS

| | | |
|---|---|---|
| 6,912,759 B2 | 7/2005 | Izadnegahdar et al. |
| 6,951,142 B2 * | 10/2005 | Ohsato .................. G01L 5/162 73/862.041 |
| 6,988,412 B1 | 1/2006 | Wilner |
| 7,045,382 B2 * | 5/2006 | Benzel ............... B81C 1/00047 438/422 |
| 7,111,518 B1 | 9/2006 | Allen et al. |
| 7,392,716 B2 | 7/2008 | Wilner |
| 7,484,422 B2 * | 2/2009 | Sumigawa ............... G01B 7/18 73/760 |
| 7,487,681 B1 | 2/2009 | Allen |
| 7,615,834 B2 * | 11/2009 | Khuri-Yakub ........ B06B 1/0292 257/416 |
| 8,183,474 B2 * | 5/2012 | Gillot ..................... B81B 3/007 174/544 |
| 8,381,596 B2 | 2/2013 | Doering |
| 8,916,944 B2 * | 12/2014 | Burchard ............. B81B 3/0072 257/418 |
| 9,034,680 B2 * | 5/2015 | Ten-Have ............... H01L 27/20 438/52 |
| 9,327,961 B2 * | 5/2016 | Lemarquand .......... H04R 23/00 |
| 9,403,677 B2 * | 8/2016 | Doelle ................. B81B 3/0018 |
| 9,409,763 B2 * | 8/2016 | Dehe ................... B81B 3/0018 |
| 9,580,299 B2 * | 2/2017 | Dehe .................. B81C 1/00158 |
| 9,581,511 B2 * | 2/2017 | Kwa ..................... G01P 15/123 |
| 9,651,441 B2 * | 5/2017 | Chiou ...................... B81C 1/00 |
| 9,745,188 B1 * | 8/2017 | Dehe .................... B81B 3/0072 |
| 9,821,340 B2 * | 11/2017 | Zhuang .................. B81B 3/007 |
| 9,936,298 B2 * | 4/2018 | Buck .................... B81B 3/0072 |
| 11,051,106 B2 * | 6/2021 | Chen .................... H01F 7/0289 |
| 2003/0029245 A1 | 2/2003 | Izadnegahdar et al. |
| 2004/0020305 A1 | 2/2004 | Kurtz et al. |
| 2005/0000291 A1 | 1/2005 | Shirai et al. |
| 2005/0160814 A1 | 7/2005 | Vaganov et al. |
| 2006/0272413 A1 | 12/2006 | Vaganov et al. |
| 2007/0215964 A1 | 9/2007 | Khuri-Yakub et al. |
| 2011/0023618 A1 | 2/2011 | Chiou et al. |
| 2015/0166327 A1 | 6/2015 | Doelle |
| 2016/0327523 A1 | 11/2016 | Shimoyama et al. |

FOREIGN PATENT DOCUMENTS

| | | |
|---|---|---|
| EP | 2552824 B1 | 2/2013 |
| EP | 3012638 A1 | 4/2016 |
| JP | 09329516 A | 12/1997 |
| WO | 2011/079078 A1 | 6/2011 |

OTHER PUBLICATIONS

Shiwei Zhou, et al., "Improving the performance of capacitive micromachined ultrasound transducers using modified membrane and support structures", IEEE Ultrasonics Symposium, dated 2005, pp. 1925-1928, 5 pages.

* cited by examiner

LOW-PRESSURE SENSOR WITH STIFFENING RIBS

BACKGROUND

Pressure sensors have become ubiquitous the past few years as they have found their way into many types of products. Utilized in automotive, industrial, consumer, and medical products, the demand for pressure sensors has skyrocketed and shows no signs of abating.

Pressure sensor systems can include pressure sensors as well as other components. Pressure sensors can typically include a diaphragm or membrane. This membrane can be formed by creating a Wheatstone bridge in a silicon wafer, then etching away the silicon from the opposite surface until a thin layer of silicon is formed beneath the Wheatstone bridge. The resulting membrane can be surrounded by a thicker, non-etched silicon water portion or frame. When a pressure sensor in a pressure sensor system experiences a pressure, the membrane can respond by changing shape. This change in shape can cause one or more characteristics of electronic components on the membrane to change. These changing characteristics can be measured, and from these measurements, the pressure can be determined.

In some applications, it can be desirable that a pressure sensor have a high sensitivity. A high sensitivity can generally be achieved by using pressure sensor having a thin membrane. A pressure sensor having a thin membrane can provide a large output when a small pressure or force is applied. But linearity errors and front-to-back span errors can be magnified when thin membranes are employed. Also, these devices can become too fragile for handling and assembling, which can result in low yields during manufacturing.

Also, large deflections in thin membranes can result in high strain concentrations. When this concentrated strain is higher than the silicon material strength, fractures or damage can result in the silicon crystal structure of the membrane. This resulting crystallographic damage can lead to errors in pressure measurements or a non-functional pressure sensor.

Thus, what is needed are pressure sensors having a high sensitivity and improved linearity, front-to-back span errors, and durability.

SUMMARY

Accordingly, embodiments of the present invention can provide pressure sensors having a high sensitivity and improved linearity, front-to-back span errors, and durability. An illustrative embodiment of the present invention can provide a pressure sensor having a high sensitivity. This high sensitivity can be achieved by utilizing a thin membrane. For example, features on the membrane can be etched such that 40 to 80 percent (2/5 to 4/5) of the thickness of the membrane is removed. This etching can occur on a first side of the membrane, where components for a Wheatstone bridge or other measurement structure are also formed. The remaining thinned membrane can deflect a larger amount for a given pressure, thus providing a relatively large output.

These and other embodiments of the present invention can provide pressure sensors that have an improved linearity. For example, the etched features can provide an inverted boss on the first side of the membrane. This boss can act to stiffen the membrane and to direct strain caused by a pressure towards the components for the Wheatstone bridge or other measurement structure, which can be located towards a periphery of the membrane. The inverted boss can be defined by inside edges of one or more inside depression areas.

These and other embodiments of the present invention can provide pressure sensors that have an improved linearity by including ribs as etched features on the first side of the membrane. These ribs can be used in conjunction with, or instead of, an inverted boss. The number of ribs can be varied. For example, one, two, three, or more than three ribs can be included. These ribs can be split into sections or they can form a complete ring around an inverted boss or center of the membrane. The ribs can be defined on each side by etched areas. For example, one or more inside ribs can have inside edges defined by the one or more inside depression areas, and outside edges defined by one or more inside rib etched areas. One or more middle stiffening ribs can be defined by one or more inside rib etched areas and one or more outside rib etched areas. One or more outside stiffening ribs can be defined by the one or more outside rib etched areas and one or more outside depression areas. The one or more middle stiffening ribs can include breaks. These breaks can be attached to beams that are located between outside depression areas. The one or more outside stiffening ribs can terminate at these beams. Components for the Wheatstone bridge or other measurement structure can each be positioned on corresponding beams. These ribs can act to stiffen the membrane and direct strain towards the components on the beams.

These and other embodiments of the present invention can further direct strain towards the beams and components by including strain concentrators. These strain concentrators can be formed as having flat, pointed, or curved edges that form narrowed portions of the outside depression areas, where the flat, pointed, or curved edges and resulting narrowed portions can direct strain towards the beams and their components for the Wheatstone bridge or other measurement structure.

These and other embodiments of the present invention can provide pressure sensors having improved front-to-back span errors and durability. For example, embodiments of the present invention can provide a pressure sensor having a membrane with an etched pattern, where the etched pattern can be comprised of a series of concentric stiffening ribs surrounding an inverted boss, large depression areas next to either or both an edge of the membrane and inverted boss, and piezoresistive strain concentrators. Adjacent edges of the stiffening ribs, the inverted boss, and the depression areas, can be oriented along [110] directions relative to the crystal axis of the silicon layer.

These concentric stiffening ribs, inverted boss, and large depression areas can collectively form a square shape in the X-Y plane, though these features can instead form another shape, such as a circle, oval, rectangle, or other shape. Each stiffening rib can have a width smaller than the inside and outside depression areas, though in these and other embodiments of the present invention, one or more stiffening ribs can have a width larger than the inside and outside depression areas. Each of the stiffening ribs can be arranged laterally with respect to each other.

These and other embodiments of the present invention can include one or more field shields and circuitry to prevent damage from electrostatic discharge (ESD.) These field shields can include a polysilicon, metal, or other layer formed over or around the components for the Wheatstone bridge or other measurement structure. Other circuits and components, such as ESD diodes, pi filters, and other components can be located on, or can be packaged with or otherwise associated with, a pressure sensor.

These pressure sensors can be encapsulated in packages for use in electronic systems. For example, a pressure sensor can be bonded to a substrate having a hole at or near its center. This combination can then be mounted onto a base of a package, also with a hole at the center. Bondpads can be electrically connected to package leads by wire-bonding, solder bumps, or other structures. A cap having an input port can be hermetically sealed to the package base.

These pressure sensors can be packaged in various configurations. For example, they can be packaged as gauge pressure sensors, absolute pressure sensors, or differential pressure sensors. Gauge pressure sensors can measure pressures with respect to the environmental pressure around the device. Absolute pressure sensors can measure the pressure with respect to an absolute reference pressure, such as a vacuum. Differential pressure sensors can measure a pressure difference between two locations. A differential pressure sensor can have two input ports for the two pressures to be measured.

These and other embodiments of the present invention can provide pressure sensors that can be manufactured in various ways. A handle wafer and a device wafer can be joined, for example by fusion bonding. These wafers can be formed of silicon, gallium-arsenide, or other material. An oxide layer can be grown on a surface of either or both the handle wafer and the device wafer, such that the oxide layer is located in the fusion bonded interface between the handle wafer and the device wafer.

The device wafer can be thinned either before or after the fusion bonding. A backside cavity can be etched in the handle wafer. The backside cavity can be formed using a deep-reactive ion etch (DRIE) or other etch or micromechanical technique. The backside cavity can be etched through the handle wafer to the oxide layer between the handle wafer and the device wafer, where the oxide layer acts as an etch-stop. This backside cavity can define the membrane in the device wafer. The etched pattern including ribs and depressions can be formed into the silicon membrane by anisotropic or isotropic etch techniques. Again, a thickness of the depression areas in the Z direction can be between ⅖ and ⅘ of the thinned silicon layer or membrane thickness. That is, the etch depth can be between ⅖ and ⅘ of the thinned silicon layer or membrane thickness, thereby removing between 40 and 80 percent of membrane in those areas. In these and other embodiments of the present invention, the etch depth can be varied, for example between 30 and 80 percent, between 50 and 80 percent, or other ranges of etch depth can be used. Piezoresistive devices can be diffused into the membrane in the regions near the strain concentrators to form the components for the Wheatstone bridge or other measurement structure.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Figure 1:
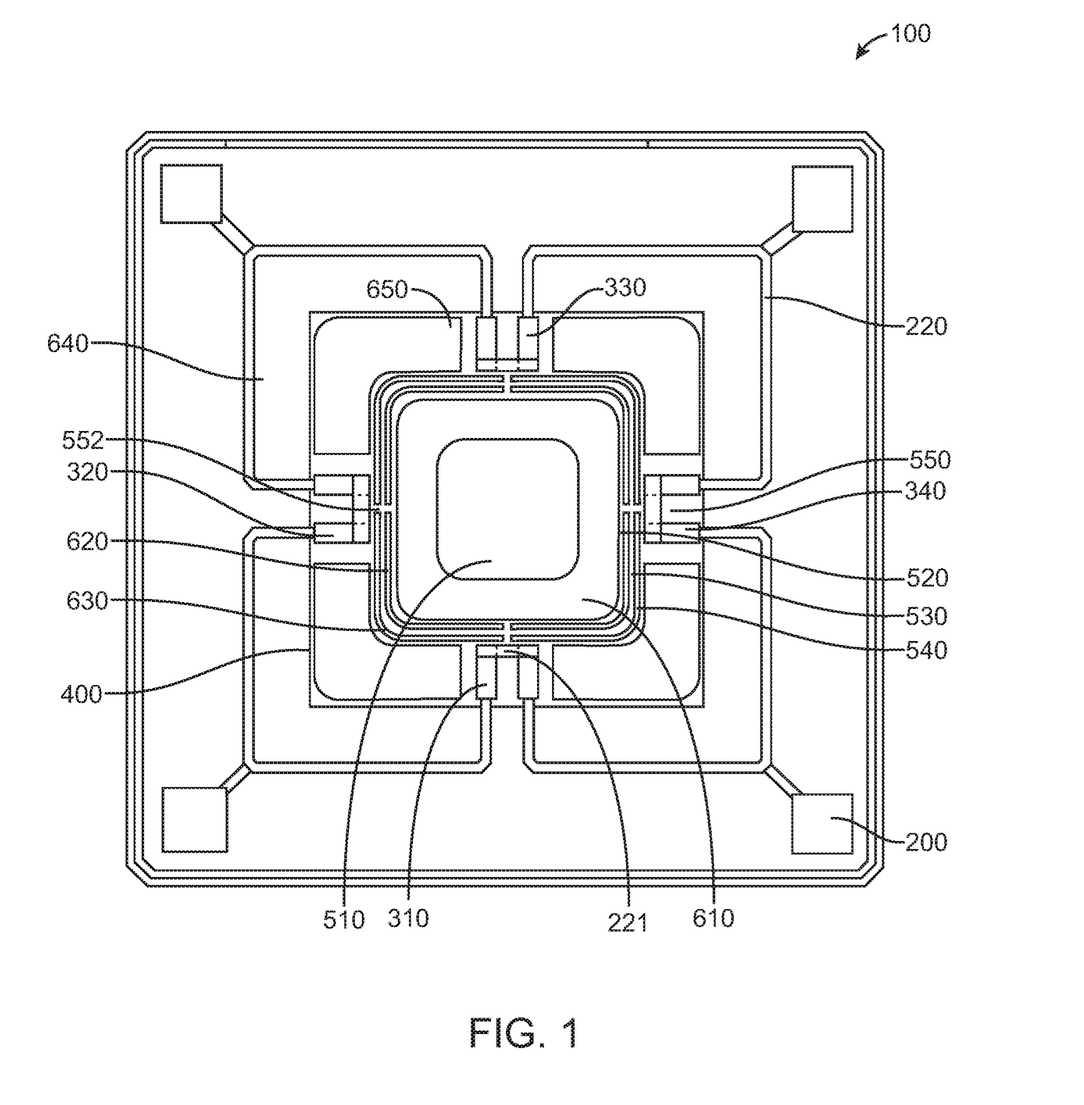
FIG. 1 illustrates a top view of a pressure sensor according to an embodiment of the present invention.

FIG. 1 illustrates a top view of a pressure sensor according to an embodiment of the present invention. This figure, as with the other included figures, is shown for illustrative purposes and does not limit either the embodiments of the present invention or the claims.

Pressure sensor 100 can include a number of regions etched into a top surface of a membrane, a number of resistors, and a number of bondpads connected to those resistors through interconnect structures. Some of the etched regions can form strain concentrators, which can concentrate strain on beams supporting the resistors. The etched areas can collectively provide pressure sensor 100 with an increased sensitivity such that it can produce a large output signal when subject to a small pressure. The patterned features that remain can collectively improve linearity, as well as front-to-back span and durability.

In this example, pressure sensor 100 can include membrane 400. A central inverted boss 510 can be ringed by an inside depression area 610, where inside depression area 610, as with the other depression areas, is an etched and thinned portion of membrane 400. An inside stiffening rib 520 can ring inside depression area 610. Inside stiffening rib 520 can be defined by inside depression area 610 and inside rib etched areas 620. Middle stiffening ribs 530 can be defined by inside rib etched areas 620 and outside rib etched areas 630. Outside stiffening ribs 540 can be defined by outside rib etched areas 630 and outside depression areas 640. Middle stiffening ribs 530 can include breaks 552. Breaks 552 can be attached to beams 550. Resistors 310, 320, 330, and 340, can each be positioned on corresponding beams 550. Resistors 310, 320, 330, and 340 can be connected to bondpads 200 via metallic interconnect paths 220.

Inverted boss 510 can increase the rigidity of membrane 400 and thereby increase device linearity. Inside depression area 610 can increase device sensitivity. Inside stiffening rib 520, middle stiffening ribs 530, and outside stiffening ribs 540 can further help to improve device linearity. Outside depression areas 640 can include narrowed or tapered regions that form strain concentrators 650. The narrow or tapered regions that form strain concentrators 650 can guide strain on membrane 400 to narrow portions of beams 550, thereby increasing the sensitivity of pressure sensor 100. Resistors 310, 320, 330, and 340 can be positioned on these narrow portions of beams 550. Resistors 310, 320, 330, and 340 can be diffused or implanted resistors. Again, these resistors can be connected to form a Wheatstone bridge having terminals connected to bondpads 200 through metallic interconnect paths 220. Pairs of resistors 310, 320, 330, and 340 can be coupled to each other through interconnect paths 221.

Again, the patterned features, such as inverted boss 510 and stiffening ribs 520, 530, and 540, can improve a front-to-back span of pressure sensor 100, where the front-to-back span error is a mismatch between a response of the pressure sensor to a pressure applied to a front or first side of the membrane and a response of the pressure sensor to a pressure applied to a back or second side of the membrane. These patterned features can also improve durability of pressure sensor 100 by improving its proof or burst pressure, where the proof or burst pressure is a pressure where crystallographic damage can occur.

In these and other embodiments of the present invention, a pressure sensor or other MEMS pressure transducer can include a silicon layer having opposing surfaces, an etched pattern in one of the surfaces of the silicon layer, and an etched cavity on the opposite surface of the silicon layer to form a membrane. Piezoresistive sensing elements can be diffused into the silicon layer and can be located near the high strain concentration areas at the edge of the silicon membrane. An example is shown in the following figure.

Figure 2:
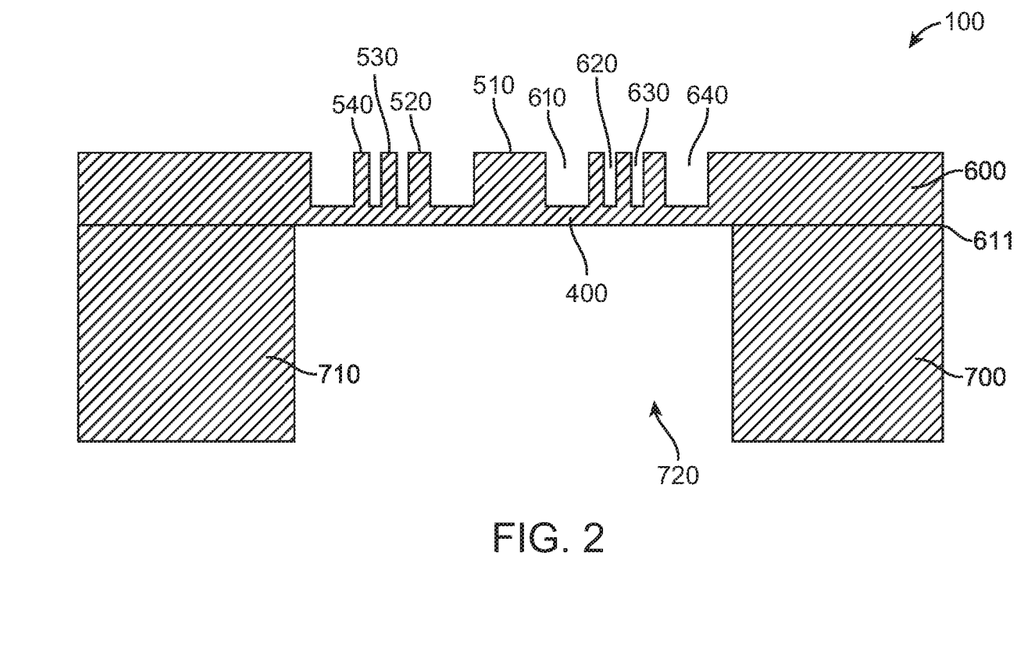
FIG. 2 illustrates a cutaway side view of a pressure sensor according to an embodiment of the present invention.

FIG. 2 illustrates a cutaway side view of a pressure sensor according to an embodiment of the present invention. This cutaway side view can be taken across either of the diagonals of pressure sensor 100 as shown in FIG. 1. Pressure sensor 100 can be formed of two wafers, specifically handle wafer 700 and device wafer 600. Handle wafer 700 and device wafer 600 can be formed of silicon, gallium-arsenide, or other material. Handle wafer 700 can be bonded to device wafer 600. For example, handle wafer 700 can be fusion bonded to device wafer 600. An oxide layer 611 can be formed on either or both handle wafer 700 and device wafer 600 before fusion bonding. Device wafer 600 can be thinned before or after fusion bonding. During manufacturing, handle wafer 700 can be etched and oxide layer 611 can provide an etch-stop to assist in the formation of backside cavity 720. That is, the handle wafer 700 can be rapidly etched, while this etching can be greatly slowed by oxide layer 611. This can provide a high degree of control in the formation of backside cavity 720. Handle wafer 700 can be etched using deep reactive ion etch or other etching or other electoral chemical or micromechanical technique. The formation of backside cavity 720 can define membrane 400 and frame 710.

Inside depression area 610 can be etched into a top side of device wafer 600 to form inverted boss 510. Outside depression areas 640 can simultaneously be etched, along with inside depression areas 610, inside rib etched areas 620 and outside rib etched areas 630 to form inside stiffening rib 520, middle stiffening ribs 530, and outside stiffening ribs 540. The etched pattern including outside depression areas 640, inside depression areas 610, inside rib etched areas 620, and outside rib etched areas 630 can be etched in membrane 400 by anisotropic or isotropic etch techniques. Again, a thickness of the depression areas in the Z direction can be between 40 and 80 percent (⅖ and ⅘) of the thinned silicon layer or membrane thickness. That is, the etch depth can be between ⅖ and ⅘ of the thinned silicon layer or membrane thickness, thereby removing between 40 and 80 percent of membrane in those areas. In these and other embodiments of the present invention, the etch depth can be varied, for example between 30 and 80 percent, between 50 and 80 percent, or other ranges of etch depth can be used. Piezoresistive devices, such as resistors 320 (shown in FIG. 3) can be diffused into the membrane in the regions near strain concentrators 650 (shown in FIG. 3) to form the components for the Wheatstone bridge or other measurement structure. While three stiffening ribs are shown in this example, these and other embodiments can include one, two, four, or more than four stiffening ribs.

Figure 3:
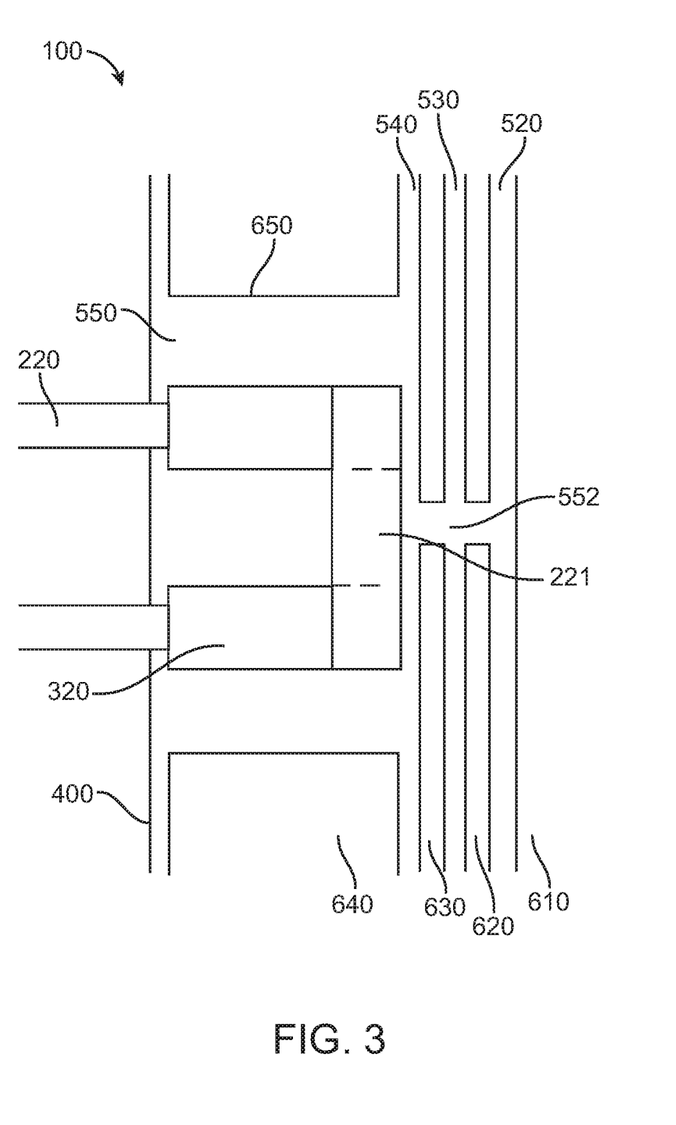
FIG. 3 illustrates a close-up view of an area around a resistor on a pressure sensor according to an embodiment of the present invention.

FIG. 3 illustrates a portion of a pressure sensor according to an embodiment of the present invention. This figure illustrates resistors 320, located on the left center, or West, of pressure sensor 100 as shown in FIG. 1. Resistors 320 can be connected to traces or metallized metallic interconnect paths 220 and to each other through interconnect path 221. Outside depression areas 640 can define beam 550 on membrane 400. In this example, outside depression areas 640 can include flat edges as strain concentrators 650, which can act to concentrate strain that results from a pressure applied by a pressure to membrane 400. The flat edges used as strain concentrators 650 can be parallel to sides of resistors 320, or they can be oblique to sides of resistors 320. The strain concentrated by strain concentrators 650 can be applied to resistors 320. Inside depression area 610, inside rib etched areas 620, and outside rib etched areas 630 can define inside stiffening rib 520, middle stiffening ribs 530, outside stiffening ribs 540, and breaks 552.

Electrical charges can affect the sensing elements of pressure sensor 100. This can be exacerbated at high temperatures when pressure sensor 100 is not shielded properly. Electrostatic discharge can also damage pressure sensor 100 or its components, such as resistors 320. Accordingly, these and other embodiments of the present invention can include one or more field shields (not shown) to prevent damage from electrostatic discharge (ESD.) These field shields can include a polysilicon, metal, or other layer formed over or around resistors 320 or other components for the Wheatstone bridge or other measurement structure. These field shields can be formed over or around resistors 320 and the other resistors on membrane 400 and can be connected to the substrate. Other circuits and components, such as ESD diodes (not shown) connected to bondpads 200 (shown in FIG. 1), pi filters, and other components, can be located on, or can be packaged with or otherwise associated with, pressure sensor 100.

Resistors 320, as with resistors 310, 330, and 340, can have different sizes, configurations, and orientations. For example, they can be larger or smaller than shown. They can be oriented in series along their major axes, or they can have different configurations. They can be rotated from what is shown, or they can have different orientations.

Figure 4:
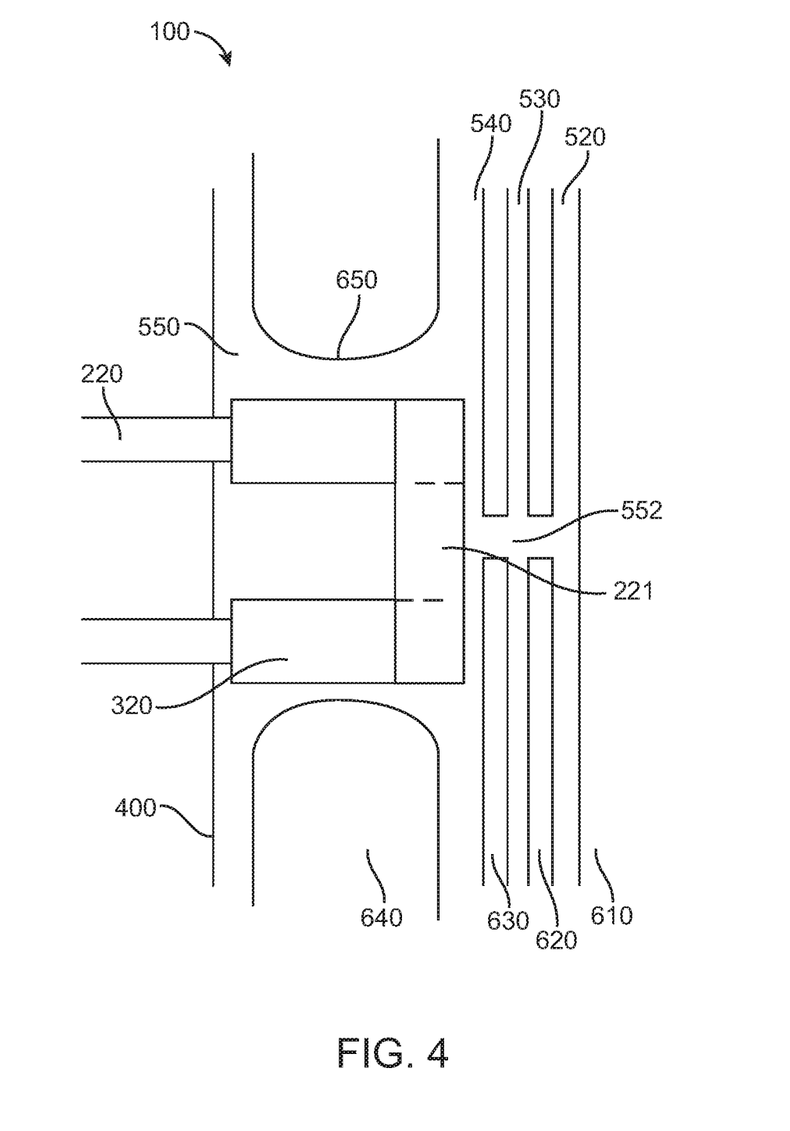
FIG. 4 illustrates a close-up view of an area around a resistor on a pressure sensor according to an embodiment of the present invention.

FIG. 4 illustrates a close-up view of an area around a resistor on a pressure sensor according to an embodiment of the present invention. This figure also illustrates resistor 320, located on the left center, or West, of pressure sensor 100 as shown in FIG. 1. Resistors 320 can be connected to metallic interconnect paths 220. Resistors 320 can be joined to each other by interconnect path 221. In this example, outside depression areas 640 can include curved edges as strain concentrators 650, which can act to concentrate strain on membrane 400 to beam 550 and resistors 320. The curved edges can have different shapes and can be offset in either direction along a length of resistors 320. A field shield (not shown) can be formed over or around resistors 320. Inside depression area 610, inside rib etched areas 620, and outside rib etched areas 630 can define inside stiffening rib 520, middle stiffening ribs 530, outside stiffening ribs 540, and breaks 552.

Figure 5:
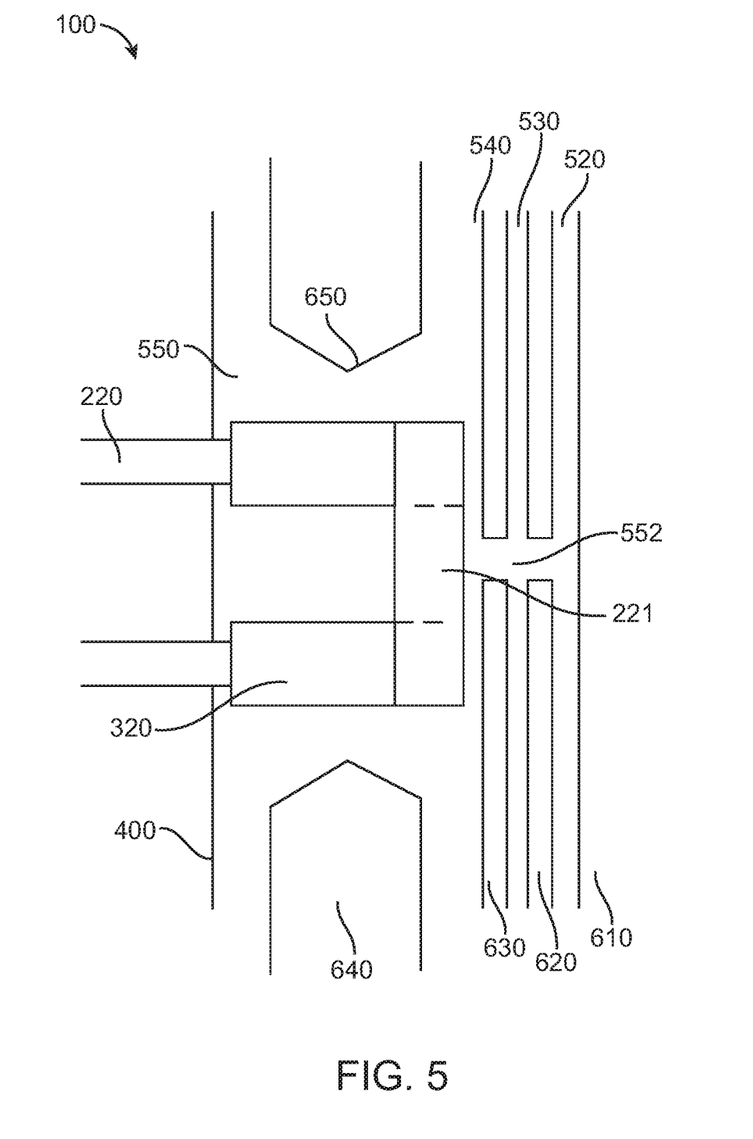
FIG. 5 is a close-up view of an area around resistor on the pressure sensor according to an embodiment of the present invention.

FIG. 5 illustrates a close-up view of an area around a resistor on a pressure sensor according to an embodiment of the present invention. This figure also illustrates resistor 320, located on the left center, or West, of pressure sensor 100 as shown in FIG. 1. Resistors 320 can be connected to metallic interconnect paths 220. Resistors 320 can be joined to each other by interconnect path 221. In this example, outside depression areas 640 can include pointed edges as strain concentrators 650, which can act to concentrate strain on membrane 400 to beam 550 and resistors 320. The pointed edges can have different shapes and can be offset in either direction along a length of resistors 320. A field shield (not shown) can be formed over or around resistors 320. Inside depression area 610, inside rib etched areas 620, and outside rib etched areas 630 can define inside stiffening rib 520, middle stiffening ribs 530, outside stiffening ribs 540, and breaks 552.

Figure 6:
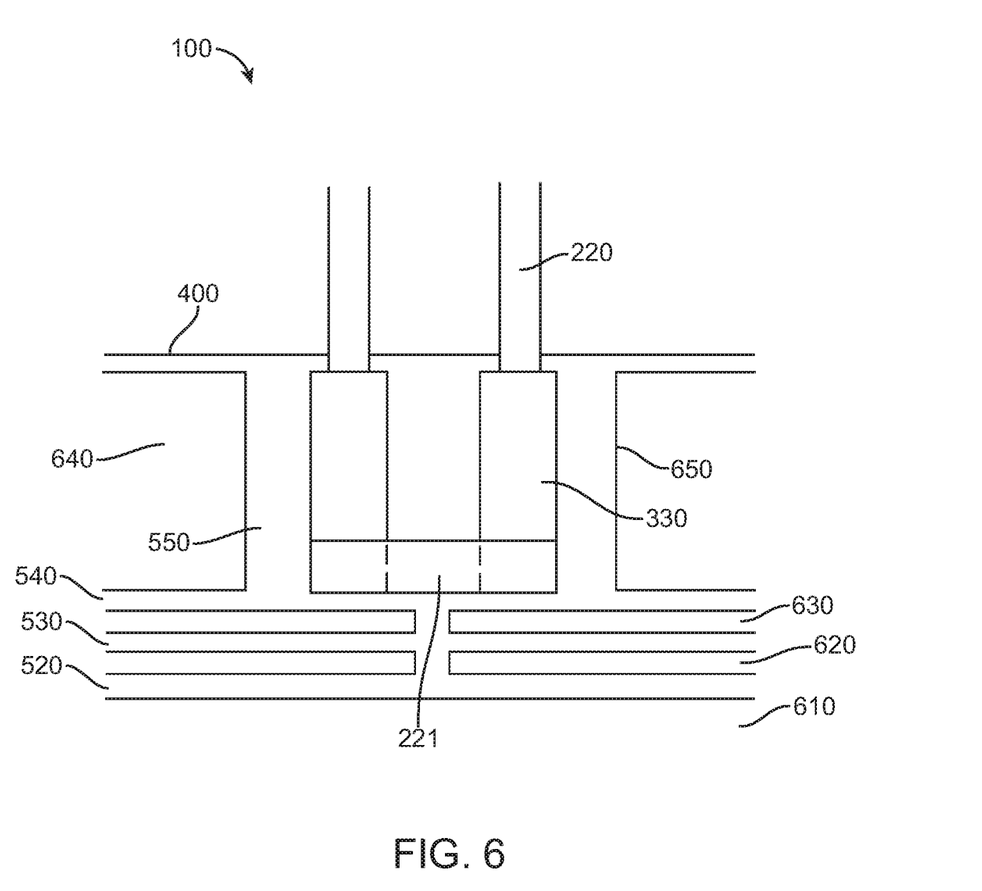
FIG. 6 is a close-up view of an area around resistor on the pressure sensor according to an embodiment of the present invention.

FIG. 6 is a close-up view of an area around resistor on the pressure sensor according to an embodiment of the present invention. Resistors 330 can be located in the top center, or North, of pressure sensor 100 as shown in FIG. 1. Resistors 330 can be connected in series through interconnect path 221. The series resistors 330 can be connected to metallic interconnect paths 220. Again, outside depression areas 640 can include flat edges as strain concentrators 650, which can act to concentrate strain on membrane 400 (shown in FIG. 3) to beam 550 and resistors 330. Strain concentrators 650 can instead have curved or pointed edges, as shown in the above examples. A field shield (not shown) can be formed over or around resistors 330. Inside depression area 610, inside rib etched areas 620, and outside rib etched areas 630 can define inside stiffening rib 520, middle stiffening ribs 530, outside stiffening ribs 540, and breaks 552.

Figure 7:
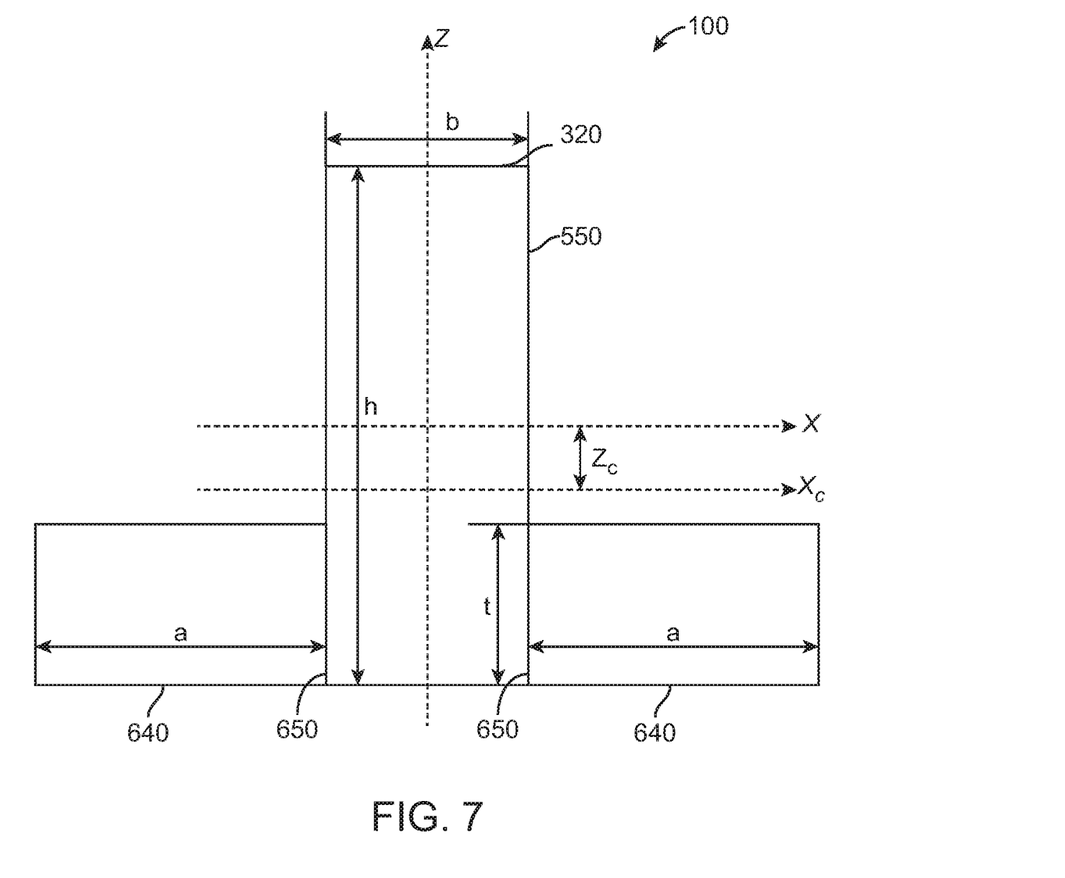
FIG. 7 illustrates dimensions for a portion of a pressure sensor according to an embodiment of the present invention.

FIG. 7 illustrates dimensions for a portion of a pressure sensor according to an embodiment of the present invention. This example shows a side-view of beam 550 having outside depression areas 640 on each side. Strain concentrators 650 can be located a sides of beam 550. Resistors 320 or other component can be located on a top of beam 550.

In this example, a vertical thickness of beam 550 is shown as "h," a vertical thickness of outside depression areas 640 are shown as "t," a lateral width of beam 550 is shown as "b," while a lateral width of outside depression areas 640 is shown as "a."

Before outside depression areas 640 are formed, a neutral axis (center of gravity) is along line X as shown. As the outside depression areas 640 are etched, the neutral axis drops an amount Zc in the Z direction to line Xc as shown. As outside depression areas 640 are completely removed, the neutral axis rises until it is again along line X. This is shown further in the following figure. By pushing the neutral axis away from resistors 320, a linearity of the resistor as a function of pressure can be improved, thereby improving the linearity of pressure sensor 100.

Figure 8:
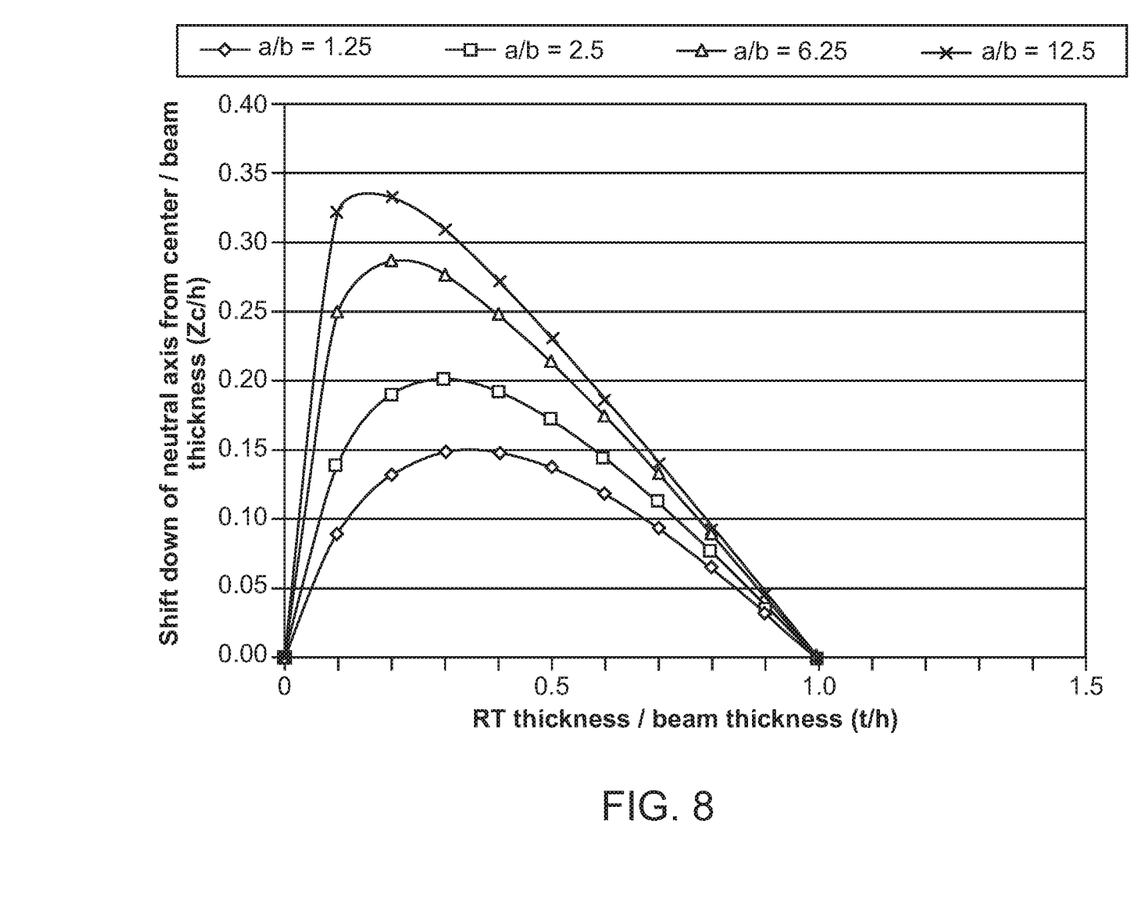
FIG. 8 illustrates the effect that changes in the dimensions shown in FIG. 6 has on the linearity of a pressure sensor according to an embodiment of the present invention.

FIG. 8 illustrates the effect that changes in the dimensions shown in FIG. 7 has on the position of the neutral axis, and thus the linearity and sensitivity of a pressure sensor, according to an embodiment of the present invention. FIG. 8 shows a shift Zc (normalized to "h") from line X (shown in FIG. 7) in the neutral axis as the ratio of a vertical thickness "t" of outside depression areas 640 to a vertical thickness "h" of beam 550 is varied. Again, where t=0 (that is, the outside depression areas 640 have been etched away), there is no shift and line X indicates the neutral axis. As "t" is increased, the neutral axis shifts down and away from X, where the shifted neutral axis is shown as Xc in FIG. 7. As "t" reaches "h," the neutral axis again reaches X and is not shifted downward. The amount that the neutral axis can be shifted is a function of a ratio of a lateral width "a" of outside depression areas 640 to a lateral width "b" of beam 550, where a narrower beam allows a greater shift in the neutral axis.

Accordingly, embodiments of the present invention can vary dimensions of beam 550 and outside depression areas 640 to adjust a linearity and sensitivity of pressure sensor 100. Again, embodiments of the present invention can vary a thickness of the depression areas in the Z direction between 40 and 80 percent ($2/5$ and $4/5$) of the thinned silicon layer or membrane thickness, though this range can be different in these and other embodiments of the present invention. That is, the etch depth can be between $2/5$ and $4/5$ of the thinned silicon layer or membrane thickness, thereby removing between 40 and 80 percent of membrane in those areas. In these and other embodiments of the present invention, the etch depth can be varied, for example between 30 and 80 percent, between 50 and 80 percent, or other ranges of etch depth can be used. A variation of etch depth of $2/5$ to $4/5$ of the membrane thickness means that $1/5$ to $3/5$ of the membrane remains, which translates to a "t" to "h" ratio between 0.2 and 0.6 along the X axis in FIG. 7. As can be seen, that range provides relatively large shifts in the neutral axis.

In these and other embodiments of the present invention, pressure sensor 100 can be encapsulated in a package for use in an electronic system. Pressure sensor 100 can be bonded to a substrate (not shown) having a hole in its center. This combination can then be mounted onto a base of a package (not shown), also with a hole at the center. Bondpads 110 can be electrically connected to package leads (not shown) by wire-bonding. A cap (not shown) having an input port can be hermetically sealed to the package base.

Pressure sensor 100 can be packaged in various ways for different applications. For example, pressure sensor 100 can be packaged as a gauge pressure sensor, an absolute pressure sensor, or a differential pressure sensor. Gauge pressure sensors can measure a pressure with respect to the environmental pressure around the device. Absolute pressure sensors can measure a pressure with respect to an absolute reference pressure, such as a vacuum. Differential pressure sensors can measure the pressure difference between two locations. A differential pressure sensor can have two input ports for the two pressures to be measured.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A pressure sensor comprising:
  a membrane that can deflect reversibly, comprising an inverted boss and a plurality of concentric depressions forming a plurality of stiffening ribs, an outside depression area, and an inside depression area;
  a nondeflecting frame supporting the membrane;
  a piezoresistive element located on the membrane near an outside edge of the membrane and near an edge of an outside stiffening rib of the plurality of stiffening ribs and the outside depression area; and a backside cavity extending from a bottom side of the pressure sensor, the backside cavity defining an inside surface of the frame, wherein the plurality of stiffening ribs are located between the inside depression area and the outside depression area, each of the plurality of stiffening ribs having two side edges; a course of the edges being defined by depressions in the plurality of concentric depressions, wherein the inverted boss is located in a mid-section of the membrane and adjacent to the inside depression area, the piezoresistive element is located closer to the outside edge of the membrane and to the outside stiffening rib than to the mid-section of the membrane, and wherein series of concentric depressions is on an opposite side of the membrane from the backside cavity.

2. The pressure sensor of claim 1 wherein the stiffening ribs each have a width that is narrower than both the outside depression area and the inside depression area.

3. The pressure sensor of claim 1 wherein side edges of the plurality of stiffening ribs are oriented along [110] directions relative to a crystal axis of the membrane.

4. The pressure sensor of claim 1 wherein the inverted boss has a width that is narrower in at least a first dimension than a width of the backside cavity.

5. The pressure sensor of claim 1 wherein the outside depression area has two side edges, the course of the side edges being oriented along [110] directions relative to a crystal axis of the membrane.

6. The pressure sensor of claim 1 wherein the backside cavity is squared in configuration and formed using a deep-reactive ion etch, with the plurality of stiffening ribs and the plurality of concentric depressions being a series of square shaped loops.

7. The pressure sensor of claim 6 wherein the plurality of concentric depressions are formed using one of either isotropic or anisotropic etching techniques, with an etch depth between $2/5$ and $4/5$ of the membrane thickness.

8. The pressure sensor of claim 1 wherein the plurality of concentric depressions have an etch depth that is approximately $4/5$ of the membrane thickness.

9. The pressure sensor of claim 1, wherein the backside cavity extends through a side of the frame opposite the membrane.

* * * * *